United States Patent
Bai et al.

(10) Patent No.: US 11,539,480 B2
(45) Date of Patent: Dec. 27, 2022

(54) DATA TRANSMISSION METHOD, DEVICE AND APPARATUS

(71) Applicant: China Academy of Telecommunications Technology, Beijing (CN)

(72) Inventors: Wei Bai, Beijing (CN); Deshan Miao, Beijing (CN)

(73) Assignee: Datang Mobile Communications Equipment Co., Ltd., Beijing (CN)

( * ) Notice: Subject to any disclaimer, the term of this patent is extended or adjusted under 35 U.S.C. 154(b) by 83 days.

(21) Appl. No.: 16/977,225

(22) PCT Filed: Feb. 22, 2019

(86) PCT No.: PCT/CN2019/075937
§ 371 (c)(1),
(2) Date: Sep. 1, 2020

(87) PCT Pub. No.: WO2019/165937
PCT Pub. Date: Sep. 6, 2019

(65) Prior Publication Data
US 2021/0006369 A1    Jan. 7, 2021

(30) Foreign Application Priority Data

Mar. 1, 2018  (CN) .......................... 201810171917.6
Aug. 16, 2018  (CN) .......................... 201810937023.3

(51) Int. Cl.
*H04W 72/04* (2009.01)
*H04L 5/00* (2006.01)
*H04W 72/12* (2009.01)

(52) U.S. Cl.
CPC ....... *H04L 5/0003* (2013.01); *H04W 72/0446* (2013.01); *H04W 72/0453* (2013.01); *H04W 72/1205* (2013.01); *H04W 72/1273* (2013.01)

(58) Field of Classification Search
None
See application file for complete search history.

(56) References Cited

U.S. PATENT DOCUMENTS

2008/0189360 A1   8/2008 Kiley et al.
2008/0259880 A1*  10/2008 Parolari ............ H04W 72/0446
                                                370/336

(Continued)

FOREIGN PATENT DOCUMENTS

CN       103763748 A     4/2014
CN       106788943 A     5/2017

(Continued)

OTHER PUBLICATIONS

NTT Docomo, Inc., Email discussions on UL transmission procedures, 3GPP TSG RAN WG1 Meeting 90bis, Prague, CA, Oct. 9-13, 2017, R1-1718814.

(Continued)

*Primary Examiner* — The Hy Nguyen
(74) *Attorney, Agent, or Firm* — Meunier Carlin & Curfman LLC (57) ABSTRACT

Disclosed by the present application are a data transmission method, device and apparatus, the method comprising: a terminal transmitting data to a base station by means of normal resources; when the base station adjusts the configuration of the normal resources so that the terminal transmits data when the normal resources are unavailable, or when the normal resources cannot complete a configured number of repeated transmissions, data is transmitted to the base station on potential resources, wherein the normal resources and the potential resources are resources used for transmitting data which are semi-statically configured for the terminal by the base station; and when the normal resources are unavailable and the potential resources do not serve as a third type of resource for other terminals, the base station and the termi- (Continued)

nal determine a potential resource for transmitting data that needs to be used according to the same mode.

20 Claims, 4 Drawing Sheets

(56) References Cited

U.S. PATENT DOCUMENTS

| | | | |
|---|---|---|---|
| 2017/0288817 A1* | 10/2017 | Cao | H04L 1/1819 |
| 2018/0139774 A1* | 5/2018 | Ma | H04W 72/042 |
| 2018/0199359 A1* | 7/2018 | Cao | H04W 72/1268 |
| 2019/0059084 A1* | 2/2019 | Lee | H04W 72/005 |
| 2020/0059935 A1* | 2/2020 | Qian | H04W 74/02 |
| 2020/0059960 A1* | 2/2020 | Shimezawa | H04L 1/1809 |
| 2020/0146032 A1* | 5/2020 | Bae | H04W 72/1268 |
| 2021/0289539 A1* | 9/2021 | Byun | H04W 72/0446 |

FOREIGN PATENT DOCUMENTS

| | | |
|---|---|---|
| CN | 106998590 A | 8/2017 |
| CN | 107295644 A | 10/2017 |
| CN | 108024366 A | 5/2018 |
| EP | 3471305 A1 | 4/2019 |
| WO | 2015115988 A1 | 8/2015 |
| WO | 2019144860 A1 | 8/2019 |

OTHER PUBLICATIONS

Huawei, Hisilicon, UL data transmission procedure without UL grant, 3GPP TSG RAN WG1 Meeting #91, Reno, USA, Nov. 27-Dec. 1, 2017, R1-1719411.
Xiaomi, UE behavior when direction confliction between UL GF and dynamic SFI, 3GPP TSG RAN WG1 Meeting AH 1801, Vancouver, Canada, Jan. 22-26, 2018, R1-1800780.
International Search Report and Written Opinion for International Application No. PCT/CN2019/075937 dated Apr. 22, 2019.
Nokia et al., "Overview of UL Data Transmission Schemes for URLLC" 3GPP Draft; R1-1701025; http://www.3gpp.org/ftp/tsg_ran/WGI_RL1/TSGR_AH/NR_AH_1701/Docs/, Jan. 10, 2017.
NTT Docomo, Inc., 3GPP TSG RAN WG1 NR Ad Hoc Meeting, Offline summary for A1 7.3.3.4 UL data transmission procedure, R1-1801080, Jan. 22-26, 2018, Vancouver, Canada.

* cited by examiner

DATA TRANSMISSION METHOD, DEVICE AND APPARATUS

The present application is a National Stage of International Application No. PCT/CN2019/075937, filed Feb. 22, 2019, which claims the priority of Chinese Patent Application No. 201810171917.6, filed to China National Intellectual Property Administration on Mar. 1, 2018, and Chinese Patent Application No. 201810937023.3, filed to China National Intellectual Property Administration on Aug. 16, 2018, all both of which are hereby incorporated by reference in their entireties.

FIELD

The present application relates to the field of wireless communication technology, in particular to a data transmission method, a device and apparatus.

BACKGROUND

The technical solution aiming at the conflict between semi-static resource configuration and dynamic changes in resource properties in current Ultra Reliable & Low Latency Communication (URLLC) is as follows.

If there is a conflict on an initial resource, delay is performed according to Table 1 below; and if there is a conflict on resources other than the initial resource, data transmission on those resources is abandoned.

Table 1 shows transmission schemes corresponding to different redundancy versions (RV) under configuration of different repetition times K in an URLLC uplink transmission without grant.

According to current standards, through Radio Resource Control (RRC) configuration, such as K=4 and RV={0 3 0 3}, the time domain resource position is {initial Orthogonal Frequency Division Multiplex (OFDM) symbol, the quantity of OFDM symbols}, and this time domain resource position is defined as a transmission opportunity (TO), namely, a resource that completes one repeated transmission, wherein K=4 means that four repeated transmissions are needed, and four TOs are needed. Here, the TO is usually continuous in time domain.

The line K=4 in Table 1 below is taken as an example. When data arrives before the first TO, the data can be transmitted from the first TO to the fourth TO, namely four times of transmission, and RV is {0 3 0 3}. When data arrives after the first TO and before the third TO, the data can be transmitted from the third TO to the fourth TO, namely two times of transmission, and RV is {0 3}. When data arrives after the third TO, data is not transmitted.

TABLE 1

|  | RV = {0 0 0 0} | RV = {0 3 0 3} | RV = {0 2 3 1} |
| --- | --- | --- | --- |
| K = 1 | {0} | {0} | {0} |
| K = 2 | {0 0} if start from 1$^{st}$ TO<br>{0} if start from 2$^{nd}$ TO | {0 3} always start from 1$^{st}$ TO | {0 2} always start from 1$^{st}$ TO |
| K = 4 | {0 0 0 0} if start from 1$^{st}$ TO<br>{0 0 0} if start from 2$^{nd}$ TO<br>{0 0} if start from 3$^{rd}$ TO<br>{0} if start from 4$^{th}$ TO | {0 3 0 3} if start from 1$^{st}$ TO<br>{0 3} if start from 3$^{rd}$ TO | {0 2 3 1} always start from 1$^{st}$ TO |
| K = 8 | {0 0 0 0 0 0 0 0} if start from 1$^{st}$ TO<br>{0 0 0 0 0 0 0} if start from 2$^{nd}$ TO<br>{0 0 0 0 0 0} if start from 3$^{rd}$ TO<br>{0 0 0 0 0} if start from 4$^{th}$ TO<br>{0 0 0 0} if start from 5$^{th}$ TO<br>{0 0 0} if start from 6$^{th}$ TO<br>{0 0} if start from 7$^{th}$ TO | {0 3 0 3 0 3 0 3} if start from 1$^{st}$ TO<br>{0 3 0 3 0 3} if start from 3$^{rd}$ TO<br>{0 3 0 3} if start from 5$^{th}$ TO<br>{0 3} if start from 7$^{th}$ TO | {0 2 3 1 0 2 3 1} always start from 1$^{st}$ TO |

The disadvantage of the prior art is that when data arrival time is inconsistent with resource configuration, semi-static resources cannot complete K repeated transmissions, so that the uplink transmission of URLLC will be partially canceled, which will affect reliability of data transmission.

Further, to enhance reliability, it is necessary to configure new resources or TOs by dynamic signaling, which will increase signaling overheads and implementation complexity.

SUMMARY

The present application provides a data transmission method and apparatus and a device, to solve the problem in data transmission unreliability caused by the conflict between semi-static resource configuration and dynamic changes in resource properties in a wireless communication system.

An embodiment of the present application provides a data transmission method, including:

transmitting, by a terminal, data to a base station on one or more normal resources; and transmitting, by the terminal, the data to the base station on one or more potential resources, in the condition that the base station adjusts a configuration for the normal resources and thus the normal resources is unable to be used for data transmission, or in the condition that repeated transmissions with a configured quantity is unable to be completed on the normal resources, wherein the normal resources and the potential resources are resources which are used for data transmission and semi-statically configured for the terminal by the base station, and in the condition that the normal resources are unavailable and the potential resources do not serve as a third type of resources for other terminals, the terminal determines the potential resources to be used for data transmission in a same manner as the base station.

Optionally, the third type of resources refers to resources dynamically scheduled by the base station to the other terminals.

Optionally, the normal resources are resources configured by explicit signaling and enabled by explicit/implicit signaling.

Optionally, the potential resources are resources configured by explicit/implicit signaling and/or automatically enabled.

Optionally, the potential resources are configured according to N adjacent resources in a resource configured period behind the normal resources in the resource configured period in the condition that the potential resources are configured by implicit signaling, wherein N is a positive integer.

Optionally, the potential resources of the previous min{M, J} resource units are used for data transmission, in the condition that transmitting on the potential resources, the normal resources have K resource units, M normal resources among the normal resources are unavailable, and J potential resources among the potential resources are available, namely, the potential resources are not used as the third type of resources of the other terminals.

Optionally, each of the resource units is a subframe, a slot, or a mini-slot.

Optionally, frequency-division multiplexing (FDM) is between the potential resources and the normal resources; or time-division multiplexing (TDM) is between the potential resources and the normal resources; or FDM is between a part of the potential resources and the normal resources, and TDM is between the other part of the potential resources and the normal resources.

Optionally, before the transmitting, by the terminal, the data to the base station on one or more potential resources, the method further includes:

determining, by the terminal, the configured potential resources through a pattern, wherein the pattern is determined according to a position of a normal transmission opportunity (TO) occupied by a first transmission of the data and/or a position of the normal resources adjusted by the base station.

Optionally, the pattern is specified by a protocol, or configured to the terminal by the base station.

Optionally, the potential resources are in a same configured period as the normal TO occupied by the first transmission of the data.

Optionally, a time interval between a time position of the normal TO occupied by the first transmission of the data and a time position of a first potential resource is larger than K2, and K2 is a predetermined value.

An embodiment of the present application provides a wireless communication device, including:

a processor configured to read a program in a memory to: process data according to requirements of a transceiver; and the transceiver configured to receive and transmit the data under control of the processor, and configured to:

transmit the data to a base station on one or more normal resources; and transmit the data to the base station on one or more potential resources, in the condition that the base station adjusts a configuration for of the normal resources and thus the normal resources is unable to be used for data transmission, or in the condition that repeated transmissions with a configured quantity is unable to be completed on the normal resources, wherein the normal resources and the potential resources are resources which are used for data transmission and semi-statically configured for the terminal by the base station, and in the condition that the normal resources are unavailable and the potential resources do not serve as a third type of resources for other terminals, the base station and the terminal determine the potential resources to be used for data transmission in the same manner.

Optionally, the third type of resources refers to resources dynamically scheduled by the base station to the other terminals.

Optionally, the normal resources are resources configured by explicit signaling and enabled by explicit/implicit signaling.

Optionally, the potential resources are resources configured by explicit/implicit signaling and/or automatically enabled.

Optionally, the potential resources are configured according to N adjacent resources in a resource configured period behind the normal resources in the resource configured period in the condition that the potential resources are configured by implicit signaling, wherein N is a positive integer.

Optionally, the potential resources of the previous min{M, J} resource units are used for data transmission, in the condition that transmitting on the potential resources, the normal resources have K resource units, M normal resources among the normal resources are unavailable, and J potential resources among the potential resources are available, namely, the potential resources are not used as the third type of resources of the other terminals.

Optionally, each of the resource units may be a subframe, a slot, a mini-slot.

Optionally, FDM is between the potential resources and the normal resources;

or TDM is between the potential resources and the normal resources;

or FDM is between a part of the potential resources and the normal resources, and TDM is adopted between the other part of the potential resources and the normal resources.

Optionally, before the transceiver transmits data to the base station on the potential resources, the processor is further configured to:

determine the configured potential resources through a pattern, wherein the pattern is determined according to a position of a TO occupied by a first transmission of the data and/or a position of the normal resources adjusted by the base station.

Optionally, the pattern is specified by a protocol, or configured to the terminal by the base station.

Optionally, the potential resources are in the same configured period as the normal TO occupied by the first transmission.

Optionally, as for time positions, a time interval between a time position of the normal TO occupied by the first transmission of the data and a time position of the first potential resource is larger than K2, and K2 is a predetermined value.

An embodiment of the present application provides a data transmission apparatus, including:

a resource determination module, configured to determine resources used for data transmission, wherein the resources are resources which are used for data transmission and semi-statically configured by a base station for a terminal, the resources include normal resources and potential resources, and in the condition that the normal resources are unavailable and the potential resources do not serve as a third type of resources of other terminals, the base station and the terminal determine the potential resources to be used for data transmission in the same manner; and a data transmission module, configured to transmit data on the normal resources, and transmit the data on the potential resources in the condition that the base station adjusts configuration of the normal resources and thus the normal resources is unable to be used for data transmission, or in the condition that repeated transmissions with a configured quantity is unable to be completed on the normal resources.

Optionally, the third type of resources refers to resources dynamically scheduled by the base station to the other terminals.

An embodiment of the present application provides a computer device, which includes a memory, a processor and a computer program stored in the memory and running on the processor, wherein the processor executes the computer program to perform the above data transmission method.

The present application has the following beneficial effects.

In the technical solution provided by the embodiments of the present application, the terminal transmits the data to the base station on the normal resources, but when the normal resources are unavailable due to signaling, the terminal transmits the data to the base station on the potential resources. Because potential resources refer to the resources needed for data transmission determined by the base station and the terminal in the same manner when the normally configured normal resources are unavailable and the potential resources do not serve as the third type of resources of the other terminals, resource configuration can be carried out flexibly. In this way, when there is a conflict between semi-static resource configuration and dynamic changes in resource properties in uplink transmission of URLLC, even when the configured normal resources cannot be used, the potential resources can be used to complete the current data transmission, so that reliability of data transmission is effectively ensured, and complex dynamic signaling is not needed for configuration.

BRIEF DESCRIPTION OF THE DRAWINGS

The drawings described herein are used to provide a further understanding of the present application and constitute a part of the present application. The illustrative embodiments and descriptions of the present application are used to explain the present application, and do not constitute an improper limitation of the present application.

DETAILED DESCRIPTION OF THE EMBODIMENTS

In the process of invention, the inventor noticed the following.

With development of demands for mobile communication services, many organizations such as 3GPP have begun to study new wireless communication systems, i.e., 5 Generation New RAT (5G NR) for future mobile communication systems. In a 5G NR system, an important demand is low-latency and high-reliability communication, and transmission schemes such as URLLC have appeared. In the uplink transmission of URLLC, in order to reduce the latency, a transmission without grant is adopted. In order to increase the reliability, a repeated transmission is adopted. In the uplink transmission of URLLC, RRC semi-static configuration or semi-persistent schedule (SPS) is adopted for resource configuration. When data arrival time is inconsistent with resource configuration, or dynamic signaling, such as slot-format information (SFI) configuration signaling indicating that a certain slot is uplink, downlink, flexible or the like, appears, resource properties are changed, and then the uplink transmission of URLLC will be partially canceled, which will affect reliability of data transmission. If additional resources are configured by dynamic signaling, the complexity of dynamic signaling will be increased. Therefore, it is necessary to solve the conflict between semi-static resource configuration and dynamic changes in resource properties in the uplink transmission of URLLC, so as to realize reliable data transmission and reduce signaling complexity.

On this basis, an embodiment of the present application provides a data transmission scheme in URLLC, and the specific implementation of the present application will be explained with reference to the attached drawings.

The implementation of a base station side and a terminal side will be explained separately, and then an example of the cooperation thereof will be given for better understanding of the implementation of the scheme given in the embodiments of the present application. This way of explanation does not mean that the two must be implemented cooperatively or independently. In fact, when the terminal and the base station are implemented separately, they also solve the problems of the terminal side and the base station side respectively, and when they are used together, better technical effects will be obtained.

Figure 1:
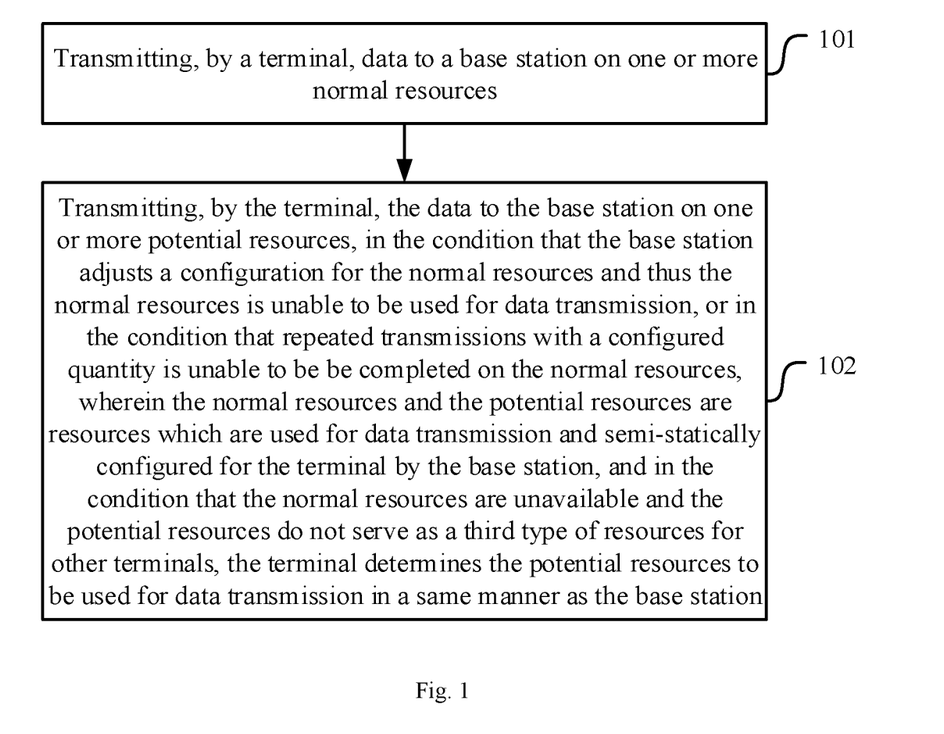
FIG. 1 is a flow chart of a data transmission method in an embodiment of the present application.

FIG. 1 is a flow chart of a data transmission method, as shown in the figure, including the following steps.

Step 101: transmitting, by a terminal, data to a base station on normal resources.

Wherein in specific implementation of this step, the terminal transmits the data to the base station on the normal resources without using potential resources; and the potential resources between the base station and the terminal are also a third type of resources between the base station and other terminals, namely, resources dynamically scheduled by the base station to the terminal, which belong to the most common resource type in LTE.

Step 102: transmitting, by the terminal, the data to the base station on the potential resources, in the condition that the base station adjusts a configuration for the normal resources and thus the normal resources cannot be used for data transmission, or when repeated transmissions with a configured quantity cannot be completed on the normal resources, wherein the normal resources and the potential resources are resources which are used for data transmission and semi-statically configured for the terminal by the base station, and when the normal resources are unavailable and the potential resources do not serve as a third type of resources for other terminals, the base station and the terminal determine the potential resources needed to be used for data transmission in the same manner.

The third type of resources refers to resources dynamically scheduled by the base station to the other terminals.

For example, the base station configures K normal resources for data transmission and N potential resources for data transmission for the terminal, wherein the potential resources refer to the resources needed for data transmission determined by the base station and the terminal in the same manner when the normal resources are unavailable and the potential resources do not serve as the third type of resources of the other terminals.

In the embodiment of the present application, the resources configured by the base station to the terminal are prioritized, wherein the resources dynamically scheduled by the base station to the terminal are given the first priority, and the resources semi-statically configured by the base station to the terminal are given the second priority. The resources with the second priority are prioritized again, with normal resources as the first priority and potential resources as the second priority. The embodiment of the present application relates to use of potential resources. The potential resources of a first terminal may be resources dynamically scheduled by a base station of a second terminal to the second terminal. Based on the priorities, the terminal firstly uses the resources with high priority for data transmission. When both the resources dynamically scheduled by the base station to the terminal and the normal resources are unavailable (for example, the base station notifies the terminal through signaling that the two types of resources are unavailable), and the potential resources are available (for example, the potential resources do not serve as resources dynamically scheduled by the base station to other terminal or normal resources of other terminals), the base station and the terminal may automatically consider using the potential resources.

The potential resources are usually semi-statically configured to the terminal by the base station through RRC signaling. The potential resources can be configured within one resource configured period or across resource configured periods.

Generally, the potential resources can be used without notification by special signaling, but sometimes the terminal can be notified about whether to use the potential resources through signaling like group-common signaling.

In implementation, the normal resources are resources configured by explicit signaling and enabled by explicit/implicit signaling. For example, the normal resources are configured through downlink control indicator (DCI) signaling and/or RRC signaling. The normally configured resources refer to the resources indicated by DCI scheduling, semi-static configuration or the like and the indication includes specific positions in frequency and time domains. In the embodiment of the present application, the time domain positions are mainly involved, and the frequency domain at different time domain positions can be the same.

Besides normal resources, resources at the same frequency domain position and some different time domain positions are assigned as potential resources. Under normal circumstances, the terminal and the base station use the normal resources for communication, instead of potential resources, and the potential resources will be configured to the base station and other terminals for communication as the third type of resources. The potential resources are used for data transmission only when the normal resources are unavailable due to dynamic SFI signaling and the terminal does not receive the message that the base station configures the potential resources to other terminals for use as the third type of resources.

In specific implementation, the notification for the potential resources can be implicit or explicit. Explicit notification is realized by RRC signaling or DCI information, and implicit notification can be, for example, N resource units following normal resources in a resource configured period. For example, the normal resources are K continuous slots (or mini-slots), and the potential resources can be N continuous slots following these K slots.

In implementation, the potential resources are resources configured by explicit/implicit signaling and/or automatically enabled.

In implementation, implicit configuration is realized by N adjacent resources in a resource configured period behind the normal resources in the resource configured period.

In specific implementation, when the potential resources are used for data transmission, it is necessary to enable the potential resources. Two conditions are required for enabling the potential resources. First, the normal resources used for communication between the terminal and the base station are unavailable. For example, the terminal receives dynamic SFI signaling, which changes the uplink and downlink properties of the normal resources, sent by the base station, so that the terminal can no longer use the normal resources for communication; second, the potential resources are not occupied. In general, as for potential resources, the priority of terminals of which normal resources are unavailable is higher. Therefore, if the base station intends to occupy the potential resources, it needs to signal the terminals of which normal resources are unavailable.

It should be noted that the reason why normally configured resources are unavailable may be that these normally configured resources are reconfigured by new DCI scheduling, semi-static configuration and the like as the third type of resources between the base station and these terminals, these normal resources are unavailable to the terminal. For example, an original uplink slot is changed into a downlink slot through dynamic SFI signaling. Then, on a time domain resource of a physical uplink shared channel (PUSCH) which the terminal is going to transmit, the terminal cannot continue to conduct uplink PUSCH transmission. In implementation, the unavailability of the normal resources caused by signaling means the unavailability of the normal resources caused by dynamic SFI signaling. Meanwhile, within a time window, the terminal does not receive a message sent by the base station that the potential resources are used by the base station as the third type of resources of the other terminals, which means that the terminal does not receive the message that the potential resources are configured by the base station to the other terminals as the third type of resources.

In specific implementation, in the condition that transmitting on the potential resources, if the normal resources have K resource units, when M normal resources among the normal resources are unavailable, and J potential resources among the potential resources are available, namely, they are not used as the third type of resources of the other terminals, the terminal can use the previous min{M, J} resource units. The resource unit may be a subframe, a slot, a mini-slot, etc.

In specific implementation, FDM is between the potential resources and the normal resources; or TDM is adopted between the potential resources and the normal resources; or FDM is between a part of the potential resources and the normal resources, and TDM is between the other part of the potential resources and the normal resources.

It should be noted that FDM is Frequency-Division Multiplexing, which is a multiplexing technology that modulates multiple baseband signals onto carriers with different frequencies and then superimposes them to form a composite signal.

TDM is Time-Division Multiplexing, which conducts division according to the time of signal transmission. It allows different signals to be transmitted at different time periods, and divides the whole transmission time into many Time Slots (TS), and each TS is occupied by one signal.

In the embodiment of the present application, FDM or TDM may be adopted between the potential resources and the normal resources, or FDM is adopted between a part of the potential resources and the normal resources, and TDM is adopted between the other part of the potential resources and the normal resources.

In specific implementation, when the terminal determines to transmit data to the base station on the potential resources, the terminal can determine the potential resources configured by a pattern before transmitting data to the base station on the potential resources, wherein the pattern is determined according to a position of a normal TO occupied by the first transmission of the data and/or a position of the normal resources adjusted by the base station.

It should be noted that pattern is a resource sequence corresponding the TO occupied by the first transmission of the data.

Specifically, the pattern may be specified by a protocol or configured to the terminal by the base station.

In specific implementation, the time interval between a time position of the first potential resource and a time position of the normal TO occupied by the first transmission is larger than K2, and K2 is a predetermined value.

It should be noted that the time interval between the first potential resource and the normal TO occupied by the first transmission is larger than K2, so that the base station is prevented from dynamically scheduling other terminals on the first potential resource.

In specific implementation, the potential resources are in the same TWG configured period as the normal TO occupied by the first transmission of the data.

It should be noted that the potential resources are in the same TWG configured period as the normal TO occupied by the first transmission of the data, so that Identity (ID) confusion in a Hybrid Automatic Repeat request (HARQ) process is avoided.

The process is described below based on the implementation processes of the combination of the terminal and the base station.

Figure 2:
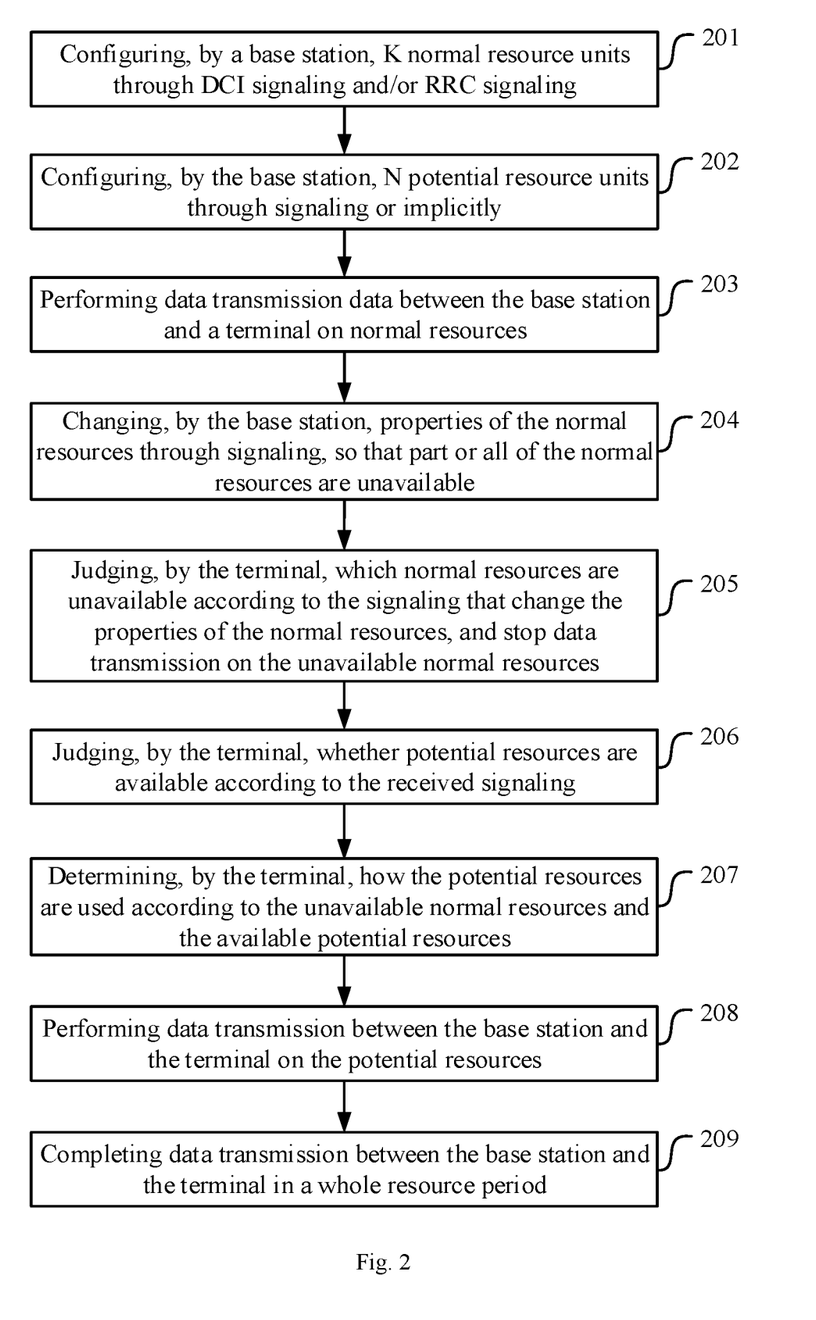
FIG. 2 is a flow chart of a data transmission method in URLLC in an embodiment of the present application.

FIG. 2 is a flow chart of a data transmission method in URLLC, as shown in the figure, including the following steps.

Step 201: configuring, by a base station, K normal resource units through DCI signaling and/or RRC signaling.

Step 202: configuring, by the base station, N potential resource units through signaling or implicitly.

Step 203: performing data transmission between the base station and a terminal on normal resources.

Step 204: changing, by the base station, the properties of the normal resources through signaling, so that part or all of the normal resources are unavailable.

Step 205: judging, by the terminal, which normal resources are unavailable according to the signaling changing the properties of the normal resources, and stopping data transmission on the unavailable normal resources.

Step 206: judging, by the terminal, whether potential resources are available according to the received signaling.

Step 207: determining, by the terminal, how the potential resources are used according to the unavailable normal resources and the available potential resources.

Step 208: performing data transmission between the base station and the terminal on the potential resources.

Step 209: completing data transmission between the base station and the terminal in a whole resource period.

Further explanation will be given below with specific examples.

Embodiment 1

According to the current standard, through RRC configuration, K=4, RV={0 3 0 3}, the time domain resource position is {initial OFDM symbol, the number of OFDM symbols}, this time domain resource position is defined as a TO, namely, a resource that completes one repeated transmission, K=4 means that four repeated transmissions are needed, and four TOs are needed. Here, the TO is usually continuous.

Considering that an uplink data packet of user equipment (UE) arrives after the first TO and before the third TO in a transmission without grant (TWG) configured period, the UE will transmit the PUSCH with RV=0 in the third TO and the PUSCH with RV=3 in the fourth TO. According to the current standards, no other transmission will be performed in this resource period. Under normal circumstances in blind detection for the PUSCH by the base station, the PUSCHs with different RVs should be detected in the third TO and the fourth TO respectively.

Assuming that there are other time resources in the TWG configured period, the base station will explicitly or implicitly notify the terminal which resources can be configured as potential TOs. The potential TOs means that they will not be used under normal circumstances, and can only be used when previous normal TOs cannot be used, the potential TOs are not used as a third type of resources of other terminals, and the base station and the terminal determine the potential TOs in the same manner, namely, both the base station and the terminal know the potential TOs should be used and how to use the potential TOs.

The terminal is configured by the base station in the way that N continuous TOs after normal TOs are potential resources.

When the PUSCH is blindly detected by the base station in the third normal TO, it knows that the terminal will continue to transmit the PUSCHs in the first and second potential TOs, so the base station usually cannot schedule other terminals for uplink data transmission in the time domain positions of the first and second potential TOs of the terminal. If the base station really intends to occupy the first and second potential TOs for uplink data transmission to other terminals, it is necessary to use dynamic signaling to notify the terminal that the potential resources cannot be used, because these potential resources have been used as the third type of resources of other terminals.

Generally, after transmitting the first PUSCH in the third normal TO and the second PUSCH in the fourth TO, the terminal will use the first and second potential TOs to transmit the PUSCHs with RV=0 and RV=3, respectively.

Embodiment 2

According to the current standard, through RRC configuration, K=4, RV={0 3 0 3}, the time domain resource position is {initial OFDM symbol, the number of OFDM symbols}, this time domain resource position is defined as a TO, namely, a resource that completes one repeated transmission, K=4 means that four repeated transmissions are needed, and four TOs are needed. Here, the TO is usually continuous.

Considering that the terminal receives dynamic SFI configuration information after the terminal transmits the PUSCH with RV=0 in the first normal TO in a TWG configured period, so that several subsequent normal TOs can no longer be used. For example, if the following two normal TOs cannot be used, the terminal will not transmit the PUSCH in the third normal TO and the fourth normal TO in this resource period according to the current standard after transmitting the PUSCH in the first normal TO and the second normal TO. Under normal circumstances in blind detection of the PUSCH by the base station, it should only blindly detect the PUSCHs on the first TO and the second TO.

Assuming that there are other time resources in the TWG configured period, the base station will explicitly or implicitly notify the terminal which resources can be configured as potential TOs. The potential TOs means that they will not be used under normal circumstances, and can only be used when previous normal TOs cannot be used, the potential TOs are not used as a third type of resources of other terminals, and the base station and the terminal determine the potential TOs in the same manner, namely, both the base station and the terminal know the potential TOs should be used and how to use the potential TOs.

The terminal is configured by the base station in the way that N continuous TOs after normal TOs are potential resources.

The PUSCH is blindly detected by the base station in the first normal TO. Meanwhile, according to dynamic SFI signaling, the terminal will not transmit the PUSCHs in the third normal TO and the fourth normal TO after transmitting the PUSCHs in the first normal TO and the second normal TO. Besides, the base station knows that the terminal will continue to transmit the PUSCHs in the first and second potential TOs, so the base station generally cannot schedule other terminals for uplink data transmission in the time domain positions of the first and second potential TOs of the terminal. If the base station really wants to occupy the first and second potential TOs for uplink data transmission to other terminals, it is necessary to use dynamic signaling to notify the terminal that the potential resources cannot be used, because these potential resources have been used as the third type of resources of other terminals.

Generally, after transmitting the first PUSCH in the first normal TO and the second PUSCH in the second TO, the terminal will not transmit the PUSCHs in the third normal TO and the fourth normal TO, and uses the first and second potential TOs to transmit the PUSCHs with RV=0 and RV=3, respectively.

Embodiment 3

According to the current standard, when the terminal transmits the data to the base station, the base station configures resources for the terminal through RRC, the time domain resource position is {initial OFDM symbol, the number of continuous OFDM symbols}, and the frequency domain resource position is a physical resource block (PRB) set configured according to type 0 or type 1.

The time domain resource position and the frequency domain resource position are defined as one TO, namely, completion of one repeated transmission, for example, K=4, RV={0 3 0 3}, which means that four repeated transmissions are needed, and four TOs are needed. Here, the TO usually occurs in K continuous time slots.

If there are 4 normal TOs in a TWG configured period, and an uplink data packet of the terminal arrives after the first TO and before the third TO in the TWG configured period, the terminal will transmit the PUSCH with RV=0 through the third TO and the PUSCH with RV=3 through the fourth TO. According to the current standard, no other data transmission will be performed. Under normal circumstances in blind detection for the PUSCH by the base station, the PUSCHs with different RVs needs to be detected in the third TO and the fourth TO.

Assuming that there are other time-frequency domain resources after the third TO in the TWG configured period, these time-frequency domain resources may be different from the time-frequency domain resources previously configured, such as different frequency domain positions and/or different time domain positions, the base station will notify the terminal explicitly or implicitly which resources can be configured as potential resources, and the terminal can transmit data through the potential resources after receiving the notification from the base station.

The potential resources are resources that will not be used under normal circumstances and can only be used when previous normal resources cannot be used and the base station and the terminal determine that the potential resources need to be used in the same manner.

Figure 3:
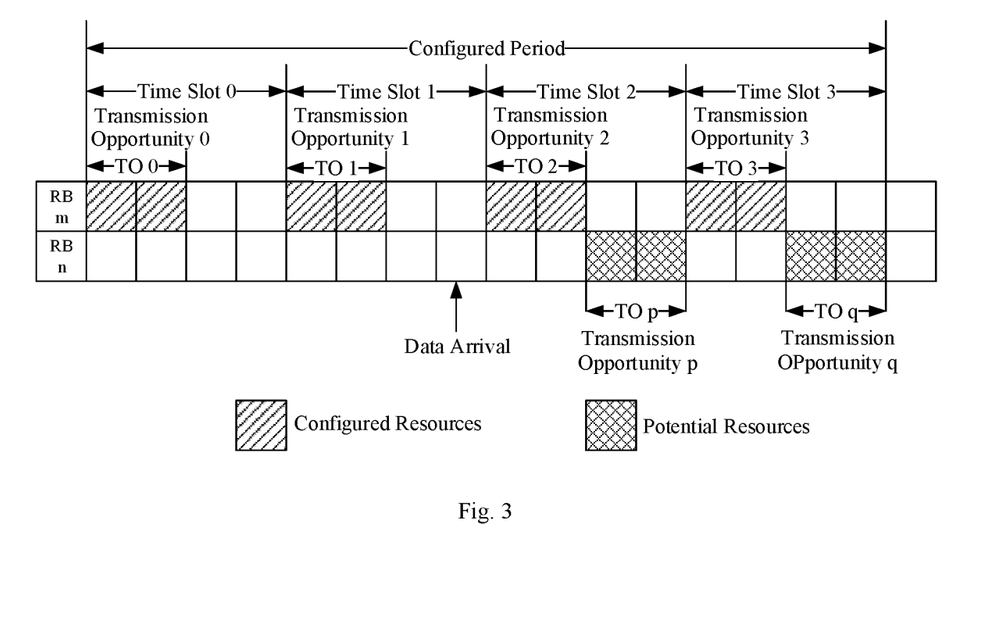
FIG. 3 is a schematic structural diagram that FDM is between potential resources and normal resources in an embodiment of the present application.

The case that FDM is between the potential resources and the normal resources is explained below with reference to the attached drawings.

As shown in FIG. 3, FDM is between the potential resources and the normal resources in an embodiment of the present application. In FIG. 3, there are four normal TOs, namely TO0, TO1, TO2 and TO3, and two potential TOs, namely TOp and TOq.

As shown in FIG. 3, the time position of the first potential resource, namely TOp, appears after the normal TO2, and the frequency domain position of the first potential resource TOp is different from the frequency domain position of the normal TOs, namely, the potential resources and the configured resources (normal TOs) are in an FDM relationship.

As an uplink data packet of the terminal arrives after the normal TO1 and before the normal TO2 in a TWG configured period, the terminal transmits the data to the base station through the normal TO2, and the base station blindly detects the PUSCH in the normal TO2, thus determining that the terminal will continue to transmit the PUSCH through the potential TOp and the potential TOq.

As the terminal will transmit data through the potential TOp and the potential TOq, the base station generally can not schedule other terminals for uplink data transmission at the time-frequency domain resource positions of the potential TOp and the potential TOq of the terminal. If the base station must occupy the potential TOp and the potential TOq for uplink data transmission to other terminals, it is necessary to use dynamic signaling to notify the terminal that the potential resources cannot be used for data transmission.

Generally, after transmitting the first PUSCH in the normal TO2 and the second PUSCH in the normal TO3, the terminal will use the potential TOp and the potential TOq to transmit the third PUSCH and the fourth PUSCH with RV=0 and RV=3, respectively.

Embodiment 4

According to the current standards, when the terminal transmits the data to the base station, the base station configures resources for the terminal through RRC, the time domain resource position is {initial OFDM symbol, the number of continuous OFDM symbols}, and the frequency domain resource position is a PRB set configured according to type 0 or type 1.

The time domain resource position and the frequency domain resource position are defined as one TO, namely, completion of one repeated transmission, for example, K=4, RV={0 0 0 0}, which means that four repeated transmissions are needed, and four TOs are needed. Here, the TO usually occurs in K continuous time slots.

A relationship between an actual number of data transmissions and a TO occupied by the first transmission in an embodiment of the present application is shown in Table 3. If the uplink data packets of the terminal arrive at different time points within a TWG configured period, the terminal will transmit the first PUSCH indifferent TOs, and the actual number of transmission times are related to the TO occupied by the first transmission, as shown in Table 3

TABLE 3

{0 0 0 0} If the first TO is occupied by the first transmission (if start from $1^{st}$ TO )
{0 0 0 } If the second TO is occupied by the first transmission (if start from $2^{nd}$ TO)
{0 0 } If the third TO is occupied by the first transmission (if start from $3^{rd}$ TO)
{0} If the fourth TO is occupied by the first transmission (if start from $4^{th}$ TO)

In Table 3, if the TO occupied by the first transmission is the first TO, the number of data transmission times is 4; if the TO occupied by the first transmission is the second TO, the actual number of data transmission times is 3; if the TO occupied by the first transmission is the third TO, the actual number of data transmission times is 2; and if the TO occupied by the first transmission is the 4th TO, the number actual of data transmission times is 1.

According to the current standard, when the terminal transmits the data to the base station, no other transmission will be performed on other resources except the normal TOs. The base station blindly detects the PUSCH.

Assuming that there are still available time-frequency domain resources after the TO occupied by the first transmission in the TWG configured period, the base station will explicitly or implicitly notify the terminal which ones among these time-frequency domain resources can be configured as potential resources, and the terminal can transmit data through the potential resources after receiving the notification from the base station.

The potential resources are resources that will not be used under normal circumstances and can only be used when previous normal resources cannot be used and the base station and the terminal determine that the potential resources need to be used in the same manner.

Figure 4:
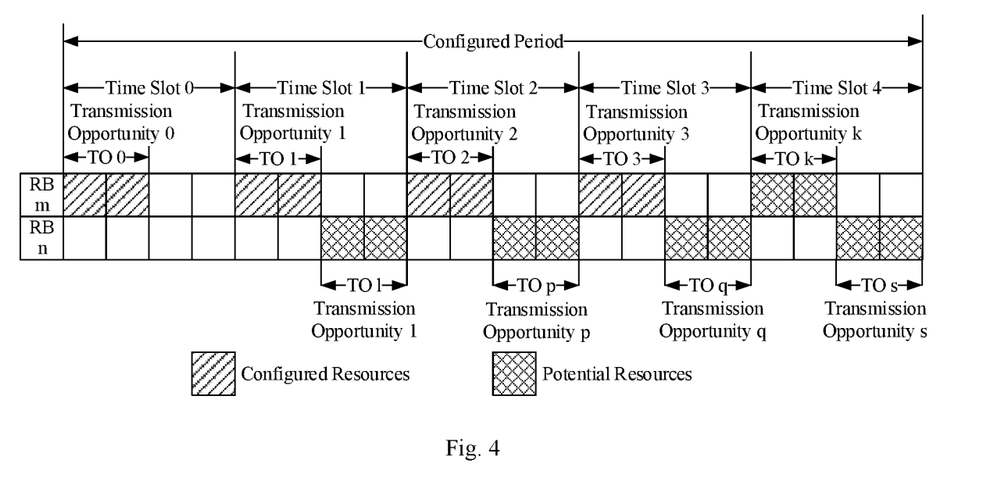
FIG. 4 is a schematic structural diagram of time-frequency domain positions of potential resources and normal resources in an embodiment of the present application.

When the base station configures resources to the terminal, as shown in FIG. 4, the base station configures four normal TOs and five potential TOs to the terminal in an configured period. The four normal TOs are TO0, TO1, TO2 and T03, and the five potential TOs are TO1, TOp, TOq, TOk and TOs.

When the uplink data packets of the terminal arrive at different time points in a TWG configured period, the base station first determines the time-frequency domain positions of the occupied normal resources and potential resources according to the TO occupied by the first transmission, and then traverses all possible TOs occupied by the first transmission to obtain a resource occupation pattern, which contains both normal resources and potential resources. As shown in Table 2, the second and third columns in Table 2 indicate pattern 1 and pattern 2 respectively.

TABLE 2

| First occupied TO | Pattern1 of TO Pattern1 of transmission opportunity | Pattern2 of TO Pattern2 of transmission opportunity |
| --- | --- | --- |
| TO0 (transmission opportunity 0) | {TO0, TO1, TO2, TO3} | {TO0, TO1, TO2, TO3} |
| TO1(transmission oPportunity 1) | {TO1, TO2, TO3, TOk} | {TO1, TO2, TO3, TOq} |
| TO2 (transmission oPportunity 2) | {TO2, TO3, TOq, TOk} | {TO2, TOp, TO3, TOq} |
| TO3 (transmission oPportunity 3) | {TO3, TOq, TOk, TOs} | {TO3, TOq, TOq2, TOq3} |

In Table 2, for example, if the first occupied TO is TO0, then the base station determines that the potential resources do not be used, and obtains a resource occupation pattern 1 {TO0, TO1, TO2, TO3}, and a resource occupation pattern 2 {TO0, TO1, TO2, TO3}.

In Table 2, for example, if the first occupied TO is TO1, then the base station determines to use one potential resource, and obtains a resource occupation pattern 1 {TO1, TO2, TO3, TOk}, and a resource occupation pattern 2 {TO1, TO2, TO3, TO3}.

It should be noted that TO q2 and TO q3 in Table 2 are not shown in FIG. 4, and it can be deemed that TO q2 and TO q3 are TOs at different frequency domain positions and at the same time position of TO q.

In Table 2, other resource occupation patterns can be added, including selection of different potential resources and different potential resource arrangement orders, all of which can form a new pattern.

Therefore, when the uplink data packets of the terminal arrive at different time points within a TWG configured period, the base station only needs to let the terminal know which pattern to use, and the terminal transmits data according to the TO in the pattern.

The terminal knows which pattern to use for data transmission, and the base station can notify the terminal of the pattern index (number), so that the terminal can determine the pattern of data transmission according to the pattern index; and the base station can also select a pattern fixedly, such as pattern 1 in Table 2, which means that the terminal always uses pattern 1 for data transmission.

Embodiment 5

According to the current standards, when the terminal transmits the data to the base station, the base station configures resources for the terminal through RRC, the time domain resource position is {initial OFDM symbol, the number of continuous OFDM symbols}, and the frequency domain resource position is a PRB set configured according to type 0 or type 1.

The time domain resource position and the frequency domain resource position are defined as one TO, namely, completion of one repeated transmission, for example, K=4, RV={0 0 0 0}, which means that four repeated transmissions are needed, and four TOs are needed. Here, the TO usually occurs in K continuous time slots.

If the uplink data packets of the terminal arrive at different time points within a TWG configured period, the terminal will transmit the first PUSCH in different TOs, and the actual number of transmission times are related to the TO occupied by the first transmission, as shown in Table 3.

According to the current standards, when the terminal transmits the data to the base station, no other transmission will be carried out on other resources except the normal TOs; and when the potential resources are used for data transmission, the terminal can know which potential resources will be used for data transmission after the first transmission.

After blindly detecting the PUSCH in the TO occupied by the first transmission, the base station can determine which potential resources will be used by the terminal for subsequent transmission according to the predefined pattern or the configured potential resources. Generally, the base station cannot schedule other terminals for uplink data transmission on these potential resources to avoid interference between users. If the base station must occupy the potential TO that the terminal needs to use for uplink data transmission to other terminals, it is necessary to use dynamic signaling to notify the terminal that the potential resources cannot be used.

Since the base station dynamically schedules the terminal to use the time-frequency domain resources containing the potential resources, the base station needs to know, that the terminal will enable the potential resources, in a time period greater than Kx before the terminal first enables the potential resources. Therefore, the time interval between the time position of the first potential resource and the time position of the normal TO occupied by the first transmission must be greater than Kx, so that the base station is prevented from dynamically scheduling other terminals on the first potential resource, wherein Kx is a predetermined value.

In addition, all potential resources must be in the same TWG configured period as the normal TO occupied by the first transmission, so that confusion of HARQ Process ID is avoided.

Based on the same inventive concept, the embodiments of the present application also provide a wireless communication device, a data transmission apparatus and a computer device. Since the principle of problem solution with these devices is similar to the data transmission method, the implementation of these devices can be understood by referring to the implementation of the method, which will not be repeated here.

Figure 5:
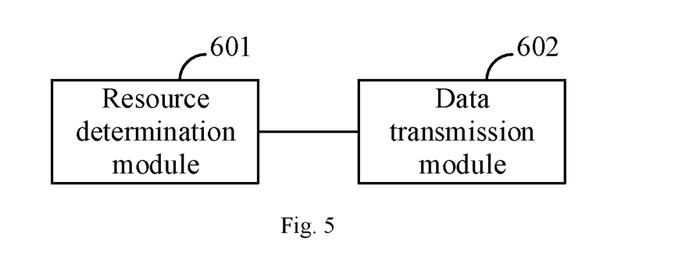
FIG. 5 is a schematic structural diagram of a data transmission apparatus in an embodiment of the present application.

FIG. 5 is a schematic structural diagram of a data transmission apparatus, as shown in the figure, which may include:

a resource determination module 601, configured to determine resources used for data transmission, wherein the resources are resources which are used for data transmission and semi-statically configured by a base station for a terminal, the resources include normal resources and potential resources, and when the normal resources are unavailable and the potential resources do not serve as a third type of resources of other terminals, the base station and the terminal determine the potential resources needed for data transmission in the same manner; and a data transmission module 302, configured to transmit data on the normal resources, and transmit the data on the potential resources when the base station adjusts a configuration for the normal resources and thus the normal resources cannot be used for data transmission, or in the condition that repeated transmissions with a configured quantity cannot be completed on the normal resources.

In implementation, an optional implementation is that the third type of resources refers to resources dynamically scheduled by the base station to the other terminals.

In implementation, an optional implementation is that the normal resources are resources configured by explicit signaling and enabled by explicit/implicit signaling.

In implementation, an optional implementation is that the potential resources are resources configured by explicit/implicit signaling and/or automatically enabled.

In implementation, an optional implementation is that the potential resources are configured according to N adjacent resources in a resource configured period behind the normal resources in the resource configured period when the potential resources are configured by implicit signaling, wherein N is a positive integer.

In implementation, an optional implementation is that the potential resources of the previous min{M, J} resource units are used for data transmission, in the condition that transmitting on the potential resources, the normal resources have K resource units, M normal resources among the normal resources are unavailable, and J potential resources among the potential resources are available, namely, the potential resources are not used as the third type of resources of the other terminals.

In implementation, an optional implementation is that the resource unit is a subframe, a slot, or a mini-slot.

In implementation, an optional implementation is that FDM is between the potential resources and the normal resources; or TDM is between the potential resources and the normal resources; or FDM is between a part of the potential resources and the normal resources, and TDM is between the other part of the potential resources and the normal resources.

In implementation, an optional implementation is that before the data transmission module 302 transmits the data to the base station on the potential resources, the resource determination module 601 is further configured to:

determine the configured potential resources through a pattern, wherein the pattern is determined according to a position of a normal transmission opportunity (TO) occupied by first transmission of the data and/or a position of the normal resources adjusted by the base station.

In implementation, an optional implementation is that the pattern is specified by a protocol, or configured to the terminal by the base station.

In implementation, an optional implementation is that the potential resources are in the same configured period as the normal TO occupied by first transmission of the data.

In implementation, an optional implementation is that a time interval between a time position of the first potential resource and a time position of the normal TO occupied by the first transmission is larger than K2, and K2 is a predetermined value.

For the convenience of description, each part of the above-mentioned apparatus is divided into various modules or units by function and described separately. Of course, during implementation of the present application, the functions of each module or unit can be implemented in one or more pieces of software or hardware.

The technical solution provided by the embodiment of the present application can be implemented as follows.

Figure 6:
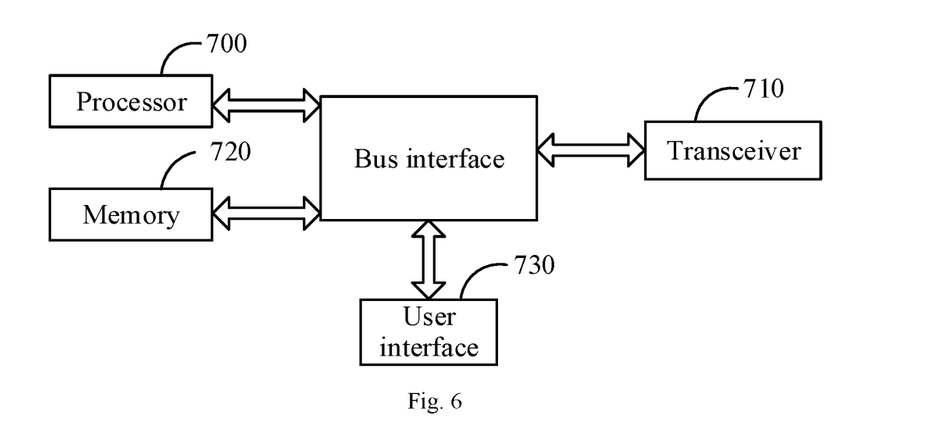
FIG. 6 is a schematic structural diagram of a wireless communication device in an embodiment of the present application.

FIG. 6 is a schematic structural diagram of a wireless communication device, as shown in the figure, which includes:

a processor 700 configured to read a program in a memory 720 to:

process data according to requirements of a transceiver; and the transceiver 710 configured to receive and transmit the data under control of the processor 700, and configured to:

transmit the data to a base station on one or more normal resources; and transmitting the data to the base station on one or more potential resources, in the condition that the base station adjusts a configuration for the normal resources and thus the normal resources is unable to be used for data transmission, or in the condition that repeated transmissions with a configured quantity cannot be completed on the normal resources, wherein the normal resources and the potential resources are resources which are used for data transmission and semi-statically configured for the terminal by the base station, and in the condition that the normal resources are unavailable and the potential resources do not serve as a third type of resources for other terminals, the base station and the terminal determine the potential resources to be used for data transmission in the same manner.

The third type of resources refers to resources dynamically scheduled by the base station to the other terminals.

In implementation, an optional implementation is that the normal resources are resources configured by explicit signaling and enabled by explicit/implicit signaling.

In implementation, an optional implementation is that the potential resources are resources configured by explicit/implicit signaling and/or automatically enabled.

In implementation, an optional implementation is that the potential resources are configured according to N adjacent resources in a resource configured period behind the normal resources in the resource configured period in the condition that the potential resources are configured by implicit signaling, wherein N is a positive integer.

In implementation, an optional implementation is that the potential resources of the previous min{M, J} resource units are used for data transmission, in the condition that transmitting on the potential resources, the normal resources have K resource units, M normal resources among the normal resources are unavailable, and J potential resources among the potential resources are available, namely, they are not used as the third type of resources of the other terminals, the previous min{M, J} resource units are used.

In implementation, an optional implementation is that the resource unit is a subframe, a slot, or a mini-slot.

In implementation, an optional implementation is that FDM is between the potential resources and the normal resources;

or TDM is between the potential resources and the normal resources;

or FDM is between a part of the potential resources and the normal resources, and TDM is between the other part of the potential resources and the normal resources.

In implementation, an optional implementation is that before the transceiver 710 transmits data to the base station on the potential resources, the processor 700 is further configured to:

determine the configured potential resources through a pattern, wherein the pattern is determined according to a position of a normal TO occupied by the first transmission of the data and/or a position of the normal resources adjusted by the base station.

In implementation, an optional implementation is that the pattern is specified by a protocol, or configured to the terminal by the base station.

In implementation, an optional implementation is that the potential resources are in the same configured period as the normal TO occupied by the first transmission of the data.

In implementation, an optional implementation is that a time position of the normal TO occupied by the first transmission of the data and a time position of a first potential resource is larger than K2, and K2 is a predetermined value.

In FIG. 6, a bus architecture may include any number of interconnected buses and bridges, and is particularly connected via various circuits of one or more processors represented by the processor 700 and memories represented by the memory 720. The bus architecture can also link together various other circuits such as peripheral devices, voltage regulators, power management circuits or the like, which are well known in the art and therefore will not be further described herein. A bus interface provides an interface. The transceiver 710 may be a plurality of elements, namely it includes a transmitter and a receiver, providing units for communicating with various other apparatuses over a transmission medium. The processor 700 is responsible for managing the bus architecture and normal processing, and the memory 720 can store data used by the processor 700 for operations.

An embodiment of the present application also provides a computer device, which includes a memory, a processor and a computer program stored in the memory and running on the processor, wherein the processor implements the above data transmission method when executing the computer program. For specific implementation, please refer to the implementation of the data transmission method.

In conclusion, in the technical solution provided by the embodiments of the present application, the terminal uses the potential resources to transmit data to the base station. The so-called potential resources refer to the resources that the base station and the terminal determine to use in the same manner when the normally configured resources are unavailable, and the potential resources can be explicitly or implicitly configured.

This solution provides a flexible resource configuration solution. When the configured normal resources cannot be used, the potential resources can be used to complete the current data transmission, so that reliability of data transmission is effectively ensured and no complex dynamic signaling is needed for configuration.

Those skilled in the art will appreciate that the embodiments of the application may be provided as methods, systems, or computer program products. Therefore, the application may take the form of a full hardware embodiment, a full software embodiment, or an embodiment combining software and hardware aspects. Furthermore, the invention may take the form of a computer program product implemented on one or more computer usable storage media (including but not limited to magnetic disk memory, optical memory, etc.) having computer usable program codes therein.

The application is described with reference to flow charts and/or block diagrams of the method, the device (system), and a computer program product according to the embodiments of the application. It should be understood that each process and/or block in the flow charts and/or block diagrams, and combinations of processes and/or blocks in the flow charts and/or block diagrams, may be implemented by computer program instructions. These computer program instructions may be provided to a processor of a general purpose computer, a special purpose computer, an embedded processor, or other programmable data processing devices to produce a machine, so that the instructions executed by the processor of the computer or other programmable data processing devices produce an apparatus for implementing the functions specified in one or more processes in the flow charts and/or one or more blocks in the block diagrams.

These computer program instructions may also be stored in a computer-readable memory which can direct a computer or other programmable data processing devices to function in a particular manner, so that the instructions stored in the computer-readable memory produce an product including an instruction apparatus which implements the functions specified in one or more processes in the flow charts and/or one or more blocks in the block diagrams.

These computer program instructions may also be loaded onto a computer or other programmable data processing devices, so that a series of operational steps are performed on the computer or other programmable devices to produce a computer implemented process. In this way, the instructions executed on the computer or other programmable devices provide steps for implementing the functions specified in one or more processes in the flow charts and/or one or more blocks in the block diagrams.

Obviously, those skilled in the art can make various changes and modifications to the application without departing from the spirit and scope of the present application. Thus, under the condition that these modifications and variations of the present application fall within the scope of the claims of the present application and their equivalents, the present application is also intended to include these modifications and variations.

What is claimed is:

1. A method for data transmission, comprising:
   transmitting, by a terminal, data to a base station on one or more normal resources; and
   transmitting, by the terminal, the data to the base station on one or more potential resources, in response to that the base station adjusts a configuration for the normal resources and thus the normal resources are unable to be used for data transmission, or in response to that repeated transmissions with a configured quantity is unable to be completed on the normal resources;
   wherein:
   the normal resources and the potential resources are resources which are used for data transmission and semi-statically configured for the terminal by the base station, the potential resources are also a third type of resources between the base station and other terminals, and the third type of resources refers to resources dynamically scheduled by the base station to the other terminals; and in response to that the normal resources are unavailable and the potential resources are not used by other terminals as the third type of resources, the terminal determines the potential resources to be used for data transmission in a same manner as the base station.

2. The method according to claim 1, wherein:
   the normal resources are resources configured by explicit signaling and enabled by explicit/implicit signaling; and/or
   the potential resources are resources configured by explicit/implicit signaling and/or automatically enabled.

3. The method according to claim 2, wherein the potential resources are configured according to N adjacent resources in a resource configured period behind the normal resources in the resource configured period in response to that the potential resources are configured by implicit signaling, wherein N is a positive integer.

4. The method according to claim 1, wherein the potential resources of a previous min {M, J} resource units are used for data transmission, in response to that transmitting on the potential resources, the normal resources have K resource units, M normal resources among the normal resources are unavailable, and J potential resources among the potential resources are available, namely, the potential resources are not used as the third type of resources of the other terminals.

5. The method according to claim 4, wherein each of the resource units is a subframe, a slot, or a mini-slot.

6. The method according to claim 1, wherein:
   frequency-division multiplexing (FDM) is between the potential resources and the normal resources; or
   time-division multiplexing (TDM) is between the potential resources and the normal resources; or
   FDM is between a part of the potential resources and the normal resources, and TDM is between the other part of the potential resources and the normal resources.

7. The method according to claim 1, wherein before the transmitting, by the terminal, the data to the base station on one or more potential resources, the method further comprises:
   determining, by the terminal, the potential resources through a pattern, wherein the pattern is determined according to a position of a normal transmission opportunity (TO) occupied by a first transmission of the data and/or a position of the normal resources adjusted by the base station.

8. The method according to claim 7, wherein the pattern is specified by a protocol, or configured to the terminal by the base station.

9. The method according to claim 7, wherein the potential resources are in a same configured period as the normal TO occupied by the first transmission of the data.

10. The method according to claim 7, wherein a time interval between a time position of the normal TO occupied by the first transmission of the data and a time position of a first potential resource is larger than K2, and K2 is a predetermined value.

11. A terminal, comprising:
    a processor configured to read a program in a memory to:
    process data according to requirements of a transceiver; and
    the transceiver configured to receive and transmit the data under control of the processor, and configured to:
    transmit the data to a base station on one or more normal resources; and
    transmit the data to the base station on one or more potential resources, in response to that the base station adjusts a configuration for the normal resources and thus the normal resources are unable to be used for data transmission, or in response to that repeated transmissions with a configured quantity is unable to be completed on the normal resources;
    wherein the normal resources and the potential resources are resources which are used for data transmission and semi-statically configured for the terminal by the base station, and the potential resources are also resources between the base station and other terminals; and in response to that the normal resources are unavailable and the potential resources are not used by other terminals as a third type of resources, the base station and the terminal determine the potential resources to be used for data transmission in the same manner, and the third type of resources refers to resources dynamically scheduled by the base station to the other terminals.

12. The terminal according to claim 11, wherein:
    the normal resources are resources configured by explicit signaling and enabled by explicit/implicit signaling; and/or the potential resources are resources configured by explicit/implicit signaling and/or automatically enabled.

13. The terminal according to claim 12, wherein the potential resources are configured according to N adjacent resources in a resource configured period behind the normal resources in the resource configured period in response to that the potential resources are configured by implicit signaling, wherein N is a positive integer.

14. The terminal according to claim 11, wherein the potential resources of a previous min {M, J} resource units are used for data transmission, in response to that transmitting on the potential resources, the normal resources have K resource units, M normal resources among the normal resources are unavailable, and J potential resources among the potential resources are available, namely, the potential resources are not used as the third type of resources of the other terminals.

15. The terminal according to claim 14, wherein each of the resource units is a subframe, a slot, or a mini-slot.

16. The terminal according to claim 11, wherein:
frequency-division multiplexing (FDM) is between the potential resources and the normal resources; or
time-division multiplexing (TDM) is between the potential resources and the normal resources; or
FDM is between a part of the potential resources and the normal resources, and TDM is between the other part of the potential resources and the normal resources.

17. The terminal according to claim 11, wherein before the transceiver transmits data to the base station on the potential resources, the processor is further configured to:
determine the potential resources through a pattern,
wherein the pattern is determined according to a position of a normal transmission opportunity (TO) occupied by a first transmission of the data and/or a position of the normal resources adjusted by the base station.

18. The terminal according to claim 17, wherein the pattern is specified by a protocol, or configured to the terminal by the base station.

19. The terminal according to claim 17, wherein the potential resources are in a same configured period as the normal TO occupied by the first transmission.

20. The terminal according to claim 17, wherein a time interval between a time position of the normal TO occupied by the first transmission of the data and a time position of a first potential resource is larger than K2, and K2 is a predetermined value.

* * * * *